(12) United States Patent
Robinson

(10) Patent No.: US 11,341,275 B2
(45) Date of Patent: May 24, 2022

(54) SYSTEM AND METHOD FOR IMPLEMENTING AND TESTING SECURITY PROTECTIONS IN COMPUTER SOFTWARE

(71) Applicant: Uleska Ltd., Belfast (GB)

(72) Inventor: Gary Robinson, Belfast (GB)

(73) Assignee: Uleska Ltd., Belfast (GB)

( * ) Notice: Subject to any disclaimer, the term of this patent is extended or adjusted under 35 U.S.C. 154(b) by 255 days.

(21) Appl. No.: 16/479,786

(22) PCT Filed: Jan. 22, 2018

(86) PCT No.: PCT/EP2018/051483
§ 371 (c)(1),
(2) Date: Jul. 22, 2019

(87) PCT Pub. No.: WO2018/134416
PCT Pub. Date: Jul. 26, 2018

(65) Prior Publication Data
US 2021/0334395 A1    Oct. 28, 2021

(30) Foreign Application Priority Data

Jan. 23, 2017    (GB) .................................... 1701128

(51) Int. Cl.
| G06F 21/62 | (2013.01) |
| G06F 11/36 | (2006.01) |
| G06F 21/45 | (2013.01) |
| G06F 21/60 | (2013.01) |
| G06F 21/00 | (2013.01) |

(52) U.S. Cl.
CPC ........ *G06F 21/629* (2013.01); *G06F 11/3688* (2013.01); *G06F 11/3692* (2013.01); *G06F 21/45* (2013.01); *G06F 21/604* (2013.01)

(58) Field of Classification Search
CPC ...... G06F 21/629; G06F 21/45; G06F 21/604; G06F 21/50; G06F 21/52; G06F 21/54; G06F 21/577; G06F 21/12; G06F 21/105
See application file for complete search history.

(56) References Cited

U.S. PATENT DOCUMENTS

| 2008/0209388 A1 | 8/2008 | Llanso et al. |
| 2010/0094805 A1 | 4/2010 | Ingerman |

(Continued)

OTHER PUBLICATIONS

EPO Form 2906 01.91TRI from related European patent application No. 18701040.0, dated Jun. 7, 2020, 5 pages.

(Continued)

*Primary Examiner* — Edward Zee
(74) *Attorney, Agent, or Firm* — Brooks, Cameron & Huebsch, PLLC

(57) ABSTRACT

A computer implemented method of applying a technical application security posture to a software project is described. The method allows an industry or corporate wide technical security posture to be enumerated. It further allows multiple software applications to be represented based on existing or proposed software (source code) producing a model representation of the application. Implementations of the technical security posture can then be combined with the software application model to ensure the necessary technical security posture is applied to the application implementation.

11 Claims, 5 Drawing Sheets

(56) References Cited

U.S. PATENT DOCUMENTS

| | | | |
|---|---|---|---|
| 2012/0017280 A1* | 1/2012 | Wiegenstein | G06F 21/577 726/25 |
| 2012/0030120 A1 | 2/2012 | Rosa | |
| 2013/0031622 A1* | 1/2013 | Berg | G06F 21/577 726/17 |
| 2013/0167191 A1 | 6/2013 | Barnett et al. | |
| 2014/0013415 A1 | 1/2014 | Sabetta | |
| 2014/0068697 A1* | 3/2014 | Brucker | G06F 21/563 726/1 |
| 2014/0289699 A1 | 9/2014 | Paterson et al. | |

OTHER PUBLICATIONS

International Search Report & Written Opinion for related PCT Application PCT/EP2018/051483 dated Apr. 13, 2018 (14 pgs).

* cited by examiner

| | |
|---|---|
| Credit Card Colour | Brown ▼ — 202 |
| Data Sensitivity | Secret — 202 |
| Encrypted in Storage | None ○   AES256 ⦿   AES512 ○   Blowfish ○ — 203 |
| Encrypted in Transit | None ○   AES256 ⦿   AES512 ○   Blowfish ○ — 203 |
| 2FA Required for Input | Yes ⦿   No ○ — 203 |
| Integrity Checking | Yes ○   No ⦿ — 203 |
| Need to Know | Yes ⦿   No ○ — 203 |
| Attack Complexity | Low ⦿   High ○ — 204 |

SYSTEM AND METHOD FOR IMPLEMENTING AND TESTING SECURITY PROTECTIONS IN COMPUTER SOFTWARE

FIELD OF THE INVENTION

The present invention relates to security standards and regulations, also known as security protections, for computer software. The invention relates particularly to applying, monitoring and enforcing security standards and regulations through identifying the need for the security protection, implementation of security protections, and assurance that security protections have been applied in computer software.

BACKGROUND TO THE INVENTION

The current field of computer software development suffers from a lack of consistent security protections being applied. As new computer software is created to satisfy the need for new features, the software development actions of planning, implementation and testing concentrate on these product features and tend not to consider security protections needed for that functionality.

In this context a security protection may comprise an instance of a technical security (application security) aspect which software applications must implement to prevent misuse of the software application, for example by a hacker or attacker. If a security protection is not in place this is typically described as a vulnerability in the software application that can be exploited, deliberately or accidentally, by an attacker or other user.

Examples of industry regulations, or standards, which include software security, are the PCI DSS regulation, Payment Services Directive (PSD2) standard, HIPAA compliance documents, OWASP Top 10 risks, and the SANS Top 25 software vulnerabilities. These regulations and standards tend to be published so that anyone can read them to understand the nature of the software vulnerability or risk described.

One example of a security protection that may be cited by these industry regulations or security standards is input validation, where input, for example user input, into a software application is validated to ensure it confirms to the expected input. For example, where a 4-digit integer input is expected, the input actually passed is checked to ensure it is a 4-digit input instead of, for example, a character string. Where the input does not confirm to the expected input, it is rejected immediately, instead of being processed incorrectly whereby unexpected outcomes can occur (such as script injection, command injection, SQL injection, and others).

A second example of a security protection is web page authorization. For example for a web site with multiple web pages, it is typically the case that certain web pages are sensitive and only can be viewed by certain users (or roles). One of these pages may be the administration page where an administrator can modify system settings, and it is expected that general shoppers on the web site cannot view this page. In this example the software application must effectively implement the authorization security protection to ensure shopper users cannot access, view, or invoke functionality from the administration page.

Open Web Application Security Project (OWASP) has lists of over 200 types of security protection issues, whereas cwe.mitre.org lists 1004 separate security issue types in their 'Common Weaknesses Enumeration') and include security protections such as input validation, authorization for functionality, web session management, sensitive data protection, data injections, and many more.

The identification of the need for implementation of, assurance of, and risk associated with security protections is specific to the software being developed. Without this software specific context, a team designing, developing or testing software may not know if a particular data item has to be protected, how it should be protected, and if the software adequately protects it. In many cases a software projects' requirements many not have identified the need for security protections to be used (for example to satisfy an industry regulation), and therefore no security is designed into the software.

Worldwide there are many industry regulations and standards that require producers of software to protect their applications, and thus end users and data, from todays' security threats. Regulations such as HIPAA, PCI DSS, FFIEC and many more require software applications to be developed with protections against security vulnerabilities. Furthermore many organizations in industries such as banking, telecoms, government, and more have their own standards and procedures regarding application security. Outside of regulatory compliance, many organizations also wish to develop software applications that are not vulnerable to malicious use, or attack, due to the high cost of business elements including loss of data, loss of business reputation, monetary reimbursement for users affected in data breaches, and more.

Large organizations create standards and procedures to reduce the risk of them experiencing data breaches that incur regulatory fines or other costs. Unfortunately these large organizations struggle to ensure their software development processes enforce and follow those standards and procedures on every project. The cost incurred by maintaining this adherence with standards or regulations is growing for many organizations.

The term 'security posture' is used to describe the measures taken by an organization to protect themselves against security threats. These security postures may be non-technical (e.g. a document describing at a high level the procedures or policies of a company in regards to security) or technical (e.g. technical standard describing how security must be applied at a software level). Typically the technical security postures are instantiating the non-technical security postures. Many organizations will record their technical and non-technical security postures in company security standards. The current field of application security deals with the discovery, definition, application and assurance of these technical security postures in industry.

As an example, an organization may define a non-technical security posture that all company web sites must apply strong authentication when a user is to perform a high risk task (e.g. approve a mortgage). To implement this policy, the technical security posture may state that any software application (e.g. a web site, or desktop application) whereby a mortgage can be approved must only be accessed by individuals who have entered 10 character passwords and entered a 6 digit pin that was sent to their mobile phone. In this case the security protection provided by the technical security posture is directly related to 1) the existence of the authentication implementation, and 2) the correctness of the authentication mechanisms' implementation. If any website does not support the required authentication, or has bugs in its implementation, then the technical security posture (and therefore the non-technical security posture) has not been properly applied.

Smaller start-ups and SMBs (Small to Medium size Businesses) may or may not have developed their own security standards, but will be subject to the same laws and industry regulations. Furthermore they are less likely to have resources to dedicate to implementing application security across their software products.

Some companies might rely on their current development teams to apply a security posture. However as the majority of software developers are not trained or skilled in application security, many aspects of a security posture may not be addressed, protections may not be applied fully, risks understood, or assured correctly. Where a company has a budget to spend on assuring their security posture they may hire application security experts, or rely on third parties such as consultants to provide security expertise. With the cyber security industry currently experiencing little or no unemployment and a need for more trained personnel, the cost of internally or externally applying a security posture is generally expensive.

Where a company turns to third party consultants, these consultants typically perform 'penetration testing' (also known as ethical hacking), which means the consultants use known ethical hacking techniques to discover if the developed application is vulnerable. This is typically a manual process, and requires time for the consultant to learn about the application being tested, and then time for the application testing to be executed. Due to the high cost of these penetration tests, they tend to be a point in time snapshot of the security posture of the software application, as to continually apply penetration testing (e.g. security testing daily or weekly) against a developing application would be too expensive.

Another way to check for application security issues is to use source code scanning tools, which attempt to find security flaws in the developed code. These tools scan the source code and report perceived flaws. In recent times these scanning tools have become easier for a software development team to use, however the industry has become concerned with the high number of false positives they report. This results in development teams having to spend time triaging the output from these tools to establish which issues are actual security issues, and which issues are a false positive. This determination is manual and requires expertise in application security.

In the known methods described, consultants 'penetration testing' and scanning tools are both reactive, meaning they find existing flaws. They do not provide proactive measures to dictate the security needed during a requirements or design (planning) phase, nor do they provide implementation of the security protections necessary. They also do not provide customized, repeatable assurance methods for the security protections needed by the software project.

It would be desirable to provide an improved system and method to identify the need for implementing and testing security protections in computer software.

SUMMARY OF THE INVENTION

A first aspect of the invention provides a method of implementing, or applying, a security posture comprising at least one security requirement for a computer software application, the method comprising:

providing, on a computer system, a security protection component comprising at least one set of at least one computer-usable instruction;

providing, on said computer system, a computer-usable representation of said security posture;

providing, on said computer system, a computer-usable model of said computer software application; and causing said computer system to use said at least one computer-usable instruction and said computer-usable representation of said security posture and said computer-usable model of said computer software application to generate at least one computer usable output for analysis and/or implementation and/or assurance of said at least one security requirement.

The, or each, security requirement may be a security protection.

Implementing, or applying, a security posture may comprise processing a security posture.

Said at least one computer usable output may be configured any one or more of analysis, implementation (or application) and/or assurance of at least one security protection.

Said causing said computer system to use said at least one set of at least one computer-usable instruction may involve populating, or otherwise configuring, at least one of said at least one instruction with data from said security posture.

Said causing said computer system to use said at least one set of at least one computer-usable instruction may involve selecting at least one of said at least one instruction depending on said security posture.

The preferred method includes causing said computer system to provide a user interface, said user interface being defined by at least one of said at least one set of at least one computer-usable instruction; and creating, in response to user input received by said user interface, said computer-usable representation of said security posture.

Said at least one of said at least one set of at least one computer-usable instruction typically comprises at least one interface template. The method may include providing a respective interface template for each of said security requirements. Optionally the, or each, interface template is configured to provide said user interface with at least one user input element for at least one of said security requirements (or security protections).

Said at least one set of at least one computer-usable instruction may comprise at least one requirement instruction comprising one or more computer-renderable instructions for implementing at least one of said security requirements (or protections). The method may include populating, or otherwise configuring, at least one of said at least one requirement instruction with data from said security posture. The method may include selecting at least one of said at least one requirement instruction depending on said security posture.

Said at least one set of at least one computer-usable instruction may comprise at least one code instruction (or implementation instruction) comprising computer-usable instructions for implementing at least one of said security requirements. The method may include populating, or otherwise configuring, at least one of said at least one code instruction with data from said security posture.

The method may include selecting at least one of said at least one code instruction depending on said security posture.

Said at least one set of at least one computer-usable instruction may comprise at least one assurance instruction comprising computer-usable instructions for testing at least one of said security requirements. The method may include populating, or otherwise configuring, at least one of said at least one assurance instruction with data from said security posture. The method may include selecting at least one of said at least one assurance code instruction depending on said security posture.

Said model may comprise data defining at least one interface supported by said software application.

Said computer-usable representation of said security posture may comprise data defining said at least one security requirement (or security protection).

Generating said at least one computer usable output may involve combining at least one of said at least one set of at least one computer-usable instruction and said computer-usable representation of said security posture and said computer-usable model of said computer software application.

Generating said at least one computer-usable output may involve populating, or otherwise configuring, at least one of said at least one set of at least one instruction with data from said security posture.

Generating said at least one computer-usable output may involve selecting at least one of said at least one set of at least one instruction depending on said security posture.

Generating said at least one computer-usable output may involve identifying from said computer-usable model at least one feature of said software application relating to at least one of said at least one security requirements, and selecting and/or populating, or otherwise configuring, at least one of said at least one set of at least one instruction using said security posture depending on said at least one identified feature of said software application.

Generating said at least one computer-usable output may involve populating, or otherwise configuring, at least one of said at least one requirement instruction with data from said security posture and/or selecting at least one of said at least one requirement instruction depending on said security posture.

Said at least one computer-usable output may comprise one or more computer-renderable instructions for implementing at least one of said security requirements.

Generating said at least one computer-usable output may involve identifying from said computer-usable model at least one feature of said software application relating to at least one of said at least one security requirements, and selecting and/or populating, or otherwise configuring, at least one of said at least one requirement instruction using said security posture depending on said at least one identified feature of said software application.

Generating said at least one computer-usable output may involve populating, or otherwise configuring, at least one of said at least one code instruction (or implementation instruction) with data from said security posture and/or selecting at least one of said at least one code instruction depending on said security posture.

Said at least one computer-usable output may comprise one or more computer-usable instructions for implementing, or addressing, at least one of said security requirements.

Generating said at least one computer-usable output may involve identifying from said computer-usable model at least one feature of said software application relating to at least one of said at least one security requirements, and selecting and/or populating, or otherwise configuring, at least one of said at least one code instruction using said security posture depending on said at least one identified feature of said software application.

Generating said at least one computer-usable output may involve populating, or otherwise configuring, at least one of said at least one assurance instruction with data from said security posture and/or selecting at least one of said at least one assurance templates depending on said security posture.

Said at least one computer-usable output may comprise one or more computer-usable instructions for testing at least one of said security requirements.

Generating said at least one computer-usable output may involve identifying from said computer-usable model at least one feature of said software application relating to at least one of said at least one security requirements, and selecting and/or populating, or otherwise configuring, at least one of said at least one assurance instruction using said security posture depending on said at least one identified feature of said software application.

Generating said at least one computer-usable output may involve identifying from said computer-usable model at least one feature of said software application relating to at least one of said at least one security requirements and, depending on said at least one identified feature of said software application: populating, or otherwise configuring, at least one of said at least one code instruction with data from said security posture; and/or selecting at least one of said at least one code instruction depending on said security posture.

A second aspect of the invention provides a computer system for implementing a security posture comprising at least one security requirement for a computer software application, the system comprising:
- a security protection component comprising at least one set of at least one computer-usable instruction;
- a computer-usable representation of said security posture;
- a computer-usable model of said computer software application; and
- a security engine component configured to use said at least one set of at least one computer-usable instruction and said computer-usable representation of said security posture and said computer-usable model of said computer software application to generate at least one computer usable output for implementing said at least one security requirement.

A third aspect of the invention provides a computer system comprising at least one processor and computer-usable instructions executable by said at least one processor to cause said computer system to perform the method of the first aspect of the invention.

Preferred embodiments of the invention relate to the Software Development Lifecycle, and in particular to the process of determining the need for any security protections, implementation of security protections, and testing of security protections in resultant software projects. The risk of any security protections not implemented for the project model can also be determined. Preferred embodiments enable an organization to ensure a consistent technical security posture be applied to all computer software projects by consuming a digitized version of the security posture/standard/regulation, understanding the technical nature of the software project, and combining both to define where each necessary security protection is required to be applied. Furthermore preferred embodiments of the invention allow the implementation of a technical security posture to be predefined and inserted directly into a new or existing software project. This may be a simple as a line of text specifying to the coder that a coding task must be completed, or it may generate new code and insert it into the current source code. This allows the technical security protections to be applied to the software project in a consistent and uniform fashion. In this context, it is assumed that a software project involves the development, updating, maintenance and/or testing of computer software and/or a computer system supporting computer software. A technical security protection may comprise one or more components or features of the computer software and/or of the computer system supporting the computer software that has a security function.

From one aspect, the invention provides a security engine combining security protections (which are pre-defined and implemented in software or a set of computer instructions), a representation of a technical security posture, and a software application project model with the aim of implementing the required security posture in a resultant software application. Preferably, the security protections are pre-defined and provide input to the security engine to produce implementations of functional requirements, software implementation and assurance for the desired security protection. Preferably, a representation of a technical security posture is combined with a representation of a software application project model to provide input to the security engine which informs the security engine of the specific nature of the security protections that are to be applied to the resulting software application. Preferably, the security engine can combine the input from each security protection with the input from the technical security posture and project model to produce outputs providing the necessary functional requirements, software implementation, project assurance, and risk calculation of each security protection.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is not described by way of example and with reference to the accompanying drawings in which like numerals are used to denote like parts and in which:

FIG. 2 shows an exemplary human-computer interface suitable for use in the method and system of FIG. 1;

DETAILED DESCRIPTION OF THE DRAWINGS

Figure 1:
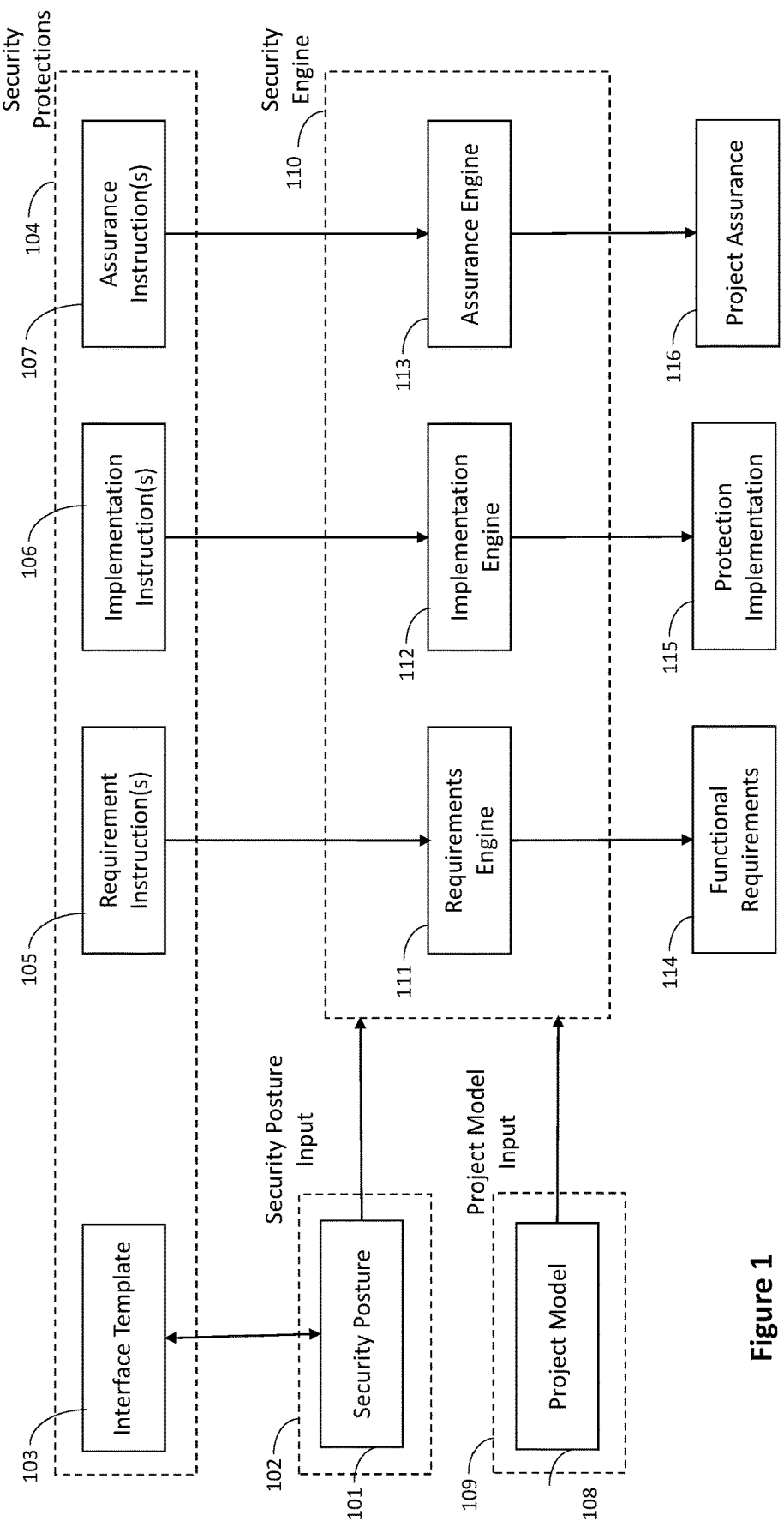
FIG. 1 is a schematic diagram illustrating conceptually a method and system for applying security protections to computer software.

Referring now in particular to FIG. 1 of the drawings there is illustrated a method and system for applying security protections to computer software in accordance with the invention. Preferred methods and systems embodying the invention allow a pre-defined application security posture to be applied to a new or existing software application. FIG. 1 shows a preferred overall process allowing such a security posture to be applied consistently to software applications or other software projects.

A computer usable security posture 101 is defined comprising data describing how one or more data item, and/or interface, and/or data storage element, and/or other aspect or feature of a computer software project, typically a computer software application, should act under the defined security posture. This security posture 101 may for example comprise an interpretation of an industry standard, such as the Payment Card Industry Data Security Standard (PCI DSS), and/or it may comprise a representation of an organization's security standard(s) defining how that organization wishes its software applications to handle data and interact with application users.

One or more aspects or features (i.e. security requirements) of the security posture 101 may be defined, by a user (not shown in FIG. 1), using a security posture input 102, which is conveniently provided as a human-computer interface (see for example FIG. 2).

A technical security posture is typically made up of multiple security requirements, each of which is implemented using a respective security protection component 104. Each security protection 104 typically comprises one or more computer software components, or other computer-implemented or computer-usable components, for use in providing one or more respective security functions. In preferred embodiments, each security protection 104 comprises an interface template 103, requirement instructions 105, implementation instructions 106 (which may be, or may comprise, one or more code instructions) and assurance instructions 107. The interface template 103, which may be implemented as any suitable computer software component(s), configures the user interface rendered to the user as the security posture input 102 and is configured to facilitate definition of one or more aspects of the relevant security protection 104 by the user. The requirement instructions 105, which for example may comprise a text file or logic, e.g. embodied as computer usable instructions, to create a user-readable file, or other file having contents that are renderable to a user by a computer, results in the output of a description of one or more requirements for the security protection 104 to allow the user to understand the relevant security function(s) that are to be implemented. The implementation instructions 106 may comprise one or more computer software components, or other computer-executable or computer-usable component(s), configured to implement the security function(s) of the security protection 104. The assurance instructions 107 may comprise one or more computer software components, or other computer-usable component(s), that may be used to test the security protection 104 when implemented, e.g. by providing one or more test inputs to the relevant software application. Assurance instructions 107 may also allow the risk represented by a security protection not being applied to be determined, e.g. descriptions of the attack vector required, or complexity of an associated attack.

It should be noted that the use of the terms 'instructions' and 'template' used herein does not limit the embodiment of each interface template 103, requirement instructions 105, implementation instructions 106 and/or assurance instructions 107 to an instruction(s) (or template) that requires text or data substitution. Examples contained in this document refer to text substitution as a simple exemplary explanation of the system. The entity that constitutes each set of instruction(s) may comprise computer software module(s), or other computer usable component(s), which may comprise computer-usable code or other computer-usable instructions, including but not limited to such for providing text and/or one or more regular expressions, that are inherently generic and which are capable of being populated, modified or otherwise combined with other system data. To this end each set of one or more instructions, or template, typically includes one or more parameters that can be set using other system data. The instruction(s) or template serve as an input to the relevant requirements engine 111 and/or implementation engine 112 (which may be or may comprise a code engine) and/or assurance engine 113 to combine the security posture 101 and project model 108 to produce the necessary output.

As a simple example from FIG. 1, a company could state in their technical security posture that all credit card numbers must be displayed in brown on all web sites. A corresponding security protection 104 may be implemented, in software where applicable, which comprises four elements:

1) The interface template 103 which is this example is configured to allows the user to input the colour they wish to make all credit card displays. When displayed in the security posture input 102 the user can in this case input 'Brown'. This selection of 'Brown' for the credit card colour becomes one element (typically of many) which combine to make the security posture 101.

2) The requirement instructions 105 which provide information allowing the user to understand the technical security protection to be provided. In this example, the requirement instructions 105 may comprise a file with the text "Requirement: All credit card numbers must be display in the colour [colour_variable]." where the [colour_variable] can later be replaced by the colour chosen by the user via the security posture input 102 (i.e. 'brown' in our example).

3) The implementation instructions 106, which may comprise one or more instructions, or a template, comprising source code, or a software library, or other computer-executable component(s) configured to implement the required security function(s) in software, which allows the security protection 104 to be realized in software. In the present example the code instructions 106 may comprise the computer program code "<div style="color[colour_variable]">", which can be generated to apply the colour chosen in the security posture 101. In this example the variable [colour_variable] would be replaced by the colour code for brown. At a later time this code can be inserted into the resultant code line (by any convenient conventional method) to implement the security protection 104.

4) The assurance instructions 107, which may for example be a template of software, or test input, whereby, in the present example, any web site or application can be tested to insure the colour of any credit card on the web page is coloured in brown.

In preferred embodiments, the security protection 104 allows the definition, implementation and assurance of the chosen definition of the security posture 101 to be realized in a consistent and assured manner for all application projects developed by an organization.

The security posture input 102 is exposed by any convenient conventional user interface 201 to the user, allowing them to define one or more aspects of the desired security posture, and in particular of the relevant security protection(s) 104. Optionally, using the security posture input 102 the user can input definitions for multiple security protections 104.

FIG. 2 shows an example security posture interface 201 whereby a credit card colour can be defined, along with a data sensitivity level. It will be understood that the security posture interface 201 is not limited to the configuration shown in FIG. 2. The configuration of the security posture interface 201 is determined by the respective interface template(s) 103, and may therefore support user-definition of any relevant aspect(s) of the respective security posture 101. The security posture interface 201 provides one or more user input elements by which the user can define one or more aspects of the security posture 101, or provide other information relating to the security posture 101. The user input elements may take any convenient conventional form, for example a drop-down list 202, a radio button 203, a text input field (used for data sensitivity input in this example) or any other GUI input element. Typically, each security protection 104 has a corresponding interface template 103, and each interface template 103 causes the security posture input 102 and corresponding interface 201 to have a corresponding user input element 202, 203, 204.

In the example of FIG. 2, the interface 201 enables the user to select from multiple options for a plurality of security protections (e.g. relating to sensitivity, encryption, authentication, checking, and availability of data, or other security attributes or features) by means of radio buttons 203 or drop-down lists 202. FIG. 2 shows example security protections, or attributes, for the data that may typically be definable as part of the security posture. It will be understood that more or fewer security protections or attributes may be supported in other embodiments depending on the relevant security posture. FIG. 2 also shows risk determining factors such as the Attack Complexity 204 used to calculate risk.

In the present example, one of the interface templates 103 allows the user to define the colour for all credit cards and so the security posture interface 201 includes a user input element (in the form of a drop-down list 202 in this example) allowing credit card colour to be selected. In this example another interface template 103 is provided for defining a data sensitivity level to allow the data sensitivity level to be applied to data items on associated software application projects. Hence the security posture interface 201 includes a user input element (in the form of a text input field in this example) allowing a data sensitivity level to be selected. The illustrated example also includes a respective interface template 103 for each of the other security protections illustrated in FIG. 2 and so the security posture interface 201 includes a user input element (in the form of a radio button 203 in this example) allowing the corresponding security attributes to be set by the user. Hence, according to the selections illustrated in FIG. 2, any data element considered 'Secret' must be encrypted in storage using the defined encryption algorithm, encrypted in transit using the defined encryption algorithm, requires two-factor authentication when data is being input into the system, does not require any integrity checking, applies a need to know policy, and requires masking of data when displayed to an end user. This example is not exhaustive nor intended to represent all security posture attributes that could be applied.

FIG. 2 shows drop down boxes, text input and radio boxes as graphical user interface (GUI) inputs, however the security posture input 102 could support any other form of data input. Alternatively, the security posture 101 may be obtained from another computer or from a computer readable medium on which it may be stored, i.e. not necessarily provided by means of the interface 201. For example, embodiments of the invention may support loading of predefined security postures from file sources in formats such as XML or JSON. The security posture could also be loaded from typical computer data stores such as flat file and database storage. This would allow common standards or regulations (e.g. OWASP Top 10, or PSD2) to be digitized once, and re-used by numerous instantiations of preferred embodiments of the invention.

A security protection 104 represents an application security aspect that software can be protected from. An example of a security protection could be input validation, another example could be functional authorization, and another example could be data integrity.

Typical embodiments of invention include multiple security protections 104 pre-defined, as in industry each software application typically requires protection from multiple types of security vulnerabilities. The respective interface template 103 of the security protection 104 enables the security posture input 102 to allow definition of the respective security attribute(s). In an example of an input validation security protection 104 the interface template 103 may add one or more GUI input elements enabling the user to input regular expressions defining the type of input that is valid. The security protection 104 includes means for implementing the security protection to a software project. To enable this, the security protection 104 may include any one or more of the requirement instructions 105, implementation instructions 106, and assurance instructions 107.

The requirement instructions 105 contain information that can be communicated to the user to facilitate application of the security protection 104. This may include information such as text, diagrams, or other forms of communication that would allow a software programmer to understand the security feature required by the security protection 104.

The implementation instructions 106 may comprise information, optionally one or more software instructions, for generating computer program code, or a software library, or other computer-usable or computer-executable instructions for implementing the security protection 104. The implementation instructions 106 may comprise computer program code, or other computer-usable or computer-executable instructions, in one or more computer programming languages, and may be combined with a project model 108 (described in more detail hereinafter), or otherwise used to produce a context specific software implementation of the security protection 104 required as one aspect of the overall security posture 101. For example the implementation instructions 106 may be configured to implement input validation in the Java software language, or to implement a functional authorization engine in, for example, C++. Implementation instructions 106 may alternatively contain descriptions of libraries to use or third-party products, which implement the security protection on behalf of the application being developed.

The assurance instructions 107 contain information to allow the security protection 104 to be confirmed or validated in the subsequent software project instantiation, e.g. software application, and the risk associated with the security protection to be determined. The assurance instructions 107 may take any one or more of a variety of forms (for example a computer program, a data file, a text file, a script file and/or or other computer-usable or computer-executable instructions) and may be used to assure that the security protection 104 has been correctly implemented or configured in the resulting software application. An example of the assurance instructions 107 is a computer program code template that, typically in combination with the project model 108, allows a software program to be generated, which when executed provides a test input to a deployed version of the software application. This testing allows the existence of the security protection 104 to be validated against a deployed version of the software application. By way of example the assurance instructions 107 may comprise a shell script that executes shell commands, or a python module that runs on top of a framework such as Google robot, or a script which would be executed by Jmeter. Another example of an assurance instructions is a textual file output which constitutes a test case for manual execution by a user to assure the security protection 104 is in place.

In preferred embodiments, to describe the software application that the security protections 104 are to be applied to, a computer-usable project model 108 is provided. The project model 108 comprises data describing, or defining, the software project's, or software application's, elements that are related to the security posture 101. The project model 108 may list one or more data attributes processed by the software application, and, for example, categorize such data according to any data sensitivities or other relevant security attributes included in the security posture 101. The project model 108 may also list software interface(s) where data is input or output, such as web pages, file interfaces, SOAP/REST interfaces, storage interfaces, and other elements as they apply to the security posture 101. Note that any and all elements of the software application can be contained in the project model 108.

In the illustrated example the project model 108 may define that the software application should display a credit card number on a particular web page. It may list the variable name, or state that the internet accessible web page can display credit cards. In another example the credit card attribute may be defined as 'Financial' data, whereby 'Financial' data is a data sensitivity defined in the security posture 101.

The project model 108 can be stored in a database or file format in a representation such as XML or JSON that could allow subsequent re-use of the project model 108, or transport/export of the project model 108 for other purposes.

Figure 3:
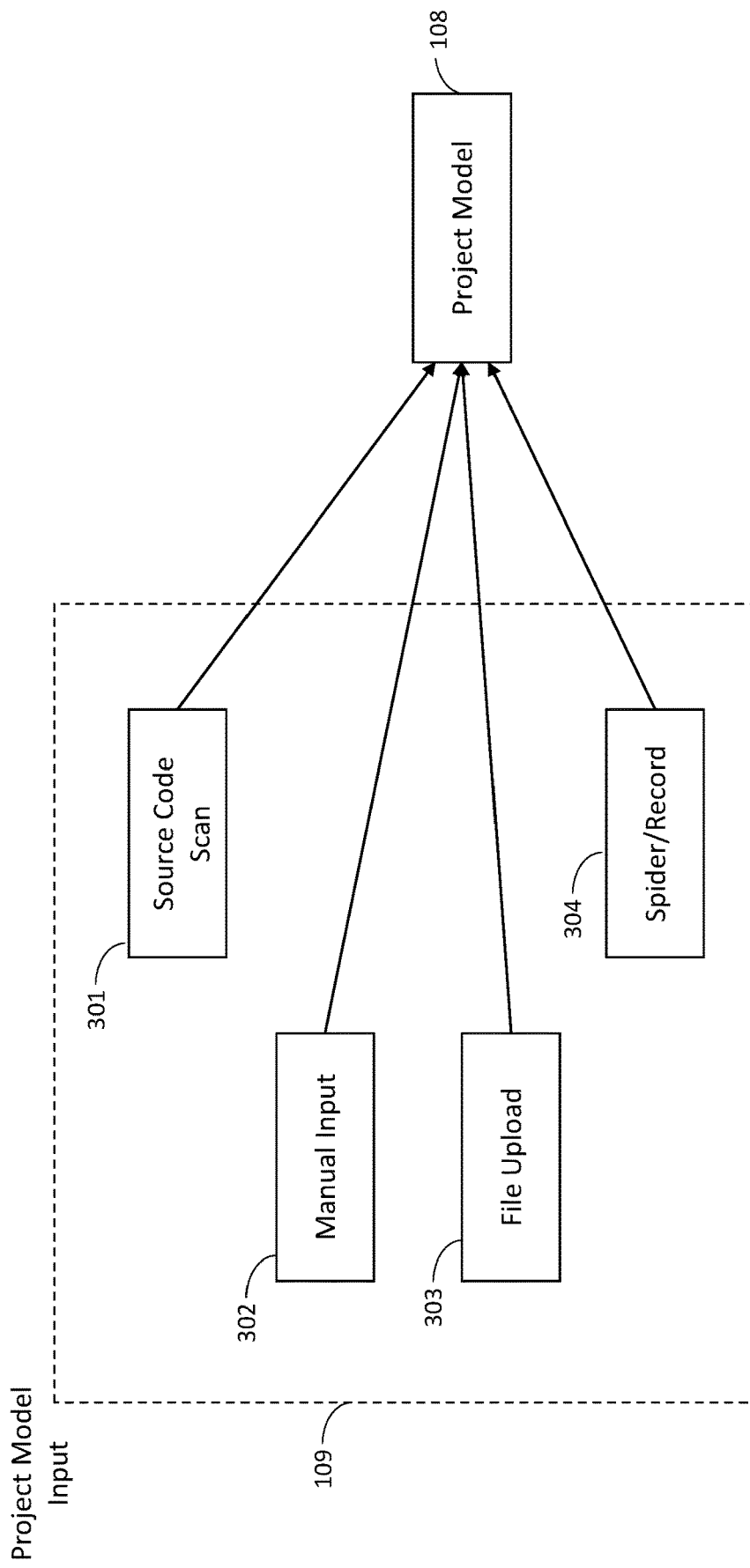
FIG. 3 is a schematic diagram illustrating a computer program code scanning process, being part of preferred embodiments of the invention.

To obtain the project model 108 embodiments of the invention may support one or more method of obtaining a representation of the software application. FIG. 3 shows a plurality of methods for obtaining the software application representation, i.e. the project model 108, via a project model input 109. The methods shown in FIG. 3 and the accompanying description are not exhaustive and are intended as examples of how the project model 108 may be obtained. At a high level a project model 108 may describe the interface(s) into the software application and the data which travels over those interface(s) (and as such may be referred to as an 'attack surface'). However the project model 108 is not limited to comprising an attack surface, and may comprise any computer-usable representation of the software application that allows the security protections 104 to be applied.

FIG. 3 shows a source code scan component 301 for scanning the software source code of the software application of the project. The source code scan 301 analyses the source code and extracts the data elements used in the code, the interfaces, data storage methods, and/or any other aspects of the source code relevant to the security posture 101. For example, if a security posture indicates all data inputs must have input validation performed, the source code scan 301 may determine all places in the source code where input is consumed, and provide a representation of that in the Project Model 108. The source code scan component 301 may take any convenient conventional form, typically comprising computer program code, or other computer-usable or computer-executable instructions. In any event the aspects of the software application extracted from the source code may then be used to provide the desired representation of the software application, i.e. the project model 108.

As an example, the source code scanner 301 may comprise computer program code or script for parsing the files within a source code directory, and to determine for example which code elements represent a web request being consumed, or a file being written to. The source code scanner 301 may identify such web requests and files as interfaces. The example source code scanner 301 may then parse the data elements read from the web request (e.g. parameters) and the data values (e.g. strings, integers) written to the file. The source code may contain information or annotations to assist in categorization of elements, e.g. a web request may be defined as 'external' and a data value may be represented as 'confidential'.

Alternatively, or in addition, the project model 108 may be created by other input methods. For example the source code scanner 301 may scan and read all the file interfaces, and then a user interface, for example interface 201, may be provided whereby the data variables can be assigned sensitivity levels.

Optionally, embodiments of the invention may support manual input 302 to describe the project model 108. A specific user interface (not shown) maybe provided for this purpose whereby attributes of the proposed or current project can be manually input by the user. For example the manual input 302 may be supported by a user interface (not shown) whereby the user can define any one or more of file interfaces, web requests and pages, database storage and reads, and the nature of the data passing over those interfaces, as required.

Optionally, embodiments of the invention may support file upload 303 as a means of obtaining the project model 108. File upload 303 may involve loading a pre-defined representation of the project model 108, conveniently in a recognized format such as XML, CSV or JSON. File upload 303 may involve loading source code files that contain information on the data or interfaces of a software project. Industry web frameworks such as Apache Struts or IIS use files to describe the web interfaces, such as web.xml or web.config. Other files such as WSDL files (for SOAP interfaces) or 'swagger' files allow the interfaces and data of a software project to be consumed in a consistent fashion.

Optionally, embodiments of the invention may support a spider or recording 304 method of inputting the project model 108, which involves recording the HTTP requests (and/or other requests) and responses going to/from a deployed software application, whereby these requests and responses can be used by embodiments of the invention to define the interfaces of a software application and the data traveling over those interfaces.

In any event, preferred embodiments of the invention use the security posture 101 and the project model 108, being a representation of the software application to which the security posture is to be applied. To apply the security posture 101 to the target software application, preferred embodiments use a security engine 110. The preferred security engine 110 takes the security posture 101 and the project model 108 as input. The security engine 110 may also use any one or more of the requirements instructions 105, implementation instructions 106 and assurance instructions 107 for the relevant security protection(s) 104, as input. The preferred security engine 110 comprises a requirements engine 111, a implementation engine 112 and an assurance engine 113, although one or more of these may be omitted in other embodiments. The security engine 110 (and the requirements engine 111, implementation engine 112 and assurance engine 113 as applicable) may be implemented in any convenient manner, typically comprising computer program code, or other computer-usable or computer-executable instructions.

The preferred security engine 110 is configured to combine, as required, the security posture 101, project model 108, and the or each requirement instructions 105 and, using the requirements engine 111, to produce one or more functional requirements 114. Typically, for each security protection 104 the requirement engine 111 produces one or more functional requirements 114 as output. Each functional requirement 114 may comprise one or more instructions, or other information pertaining to the implementation of the security protection 104, that are renderable to the user by any convenient user interface (not shown), e.g. a GUI, and may be provided as a computer usable or computer renderable file. In the present example the requirement instructions 105 comprises the text "Requirement: All credit card numbers must be display in the colour [colour_variable].". In this case, the requirements engine 111 determines from the project model 108 that a credit card output exists in the application, and determines from the security posture 101 that the colour 'brown' is selected. The requirements engine 111 combines the security posture 101 colour 'brown' with the requirement instructions 105 to produce the output functional requirement 114 "Requirement: All credit card numbers must be display in the colour brown.", which may be rendered to the user in any convenient manner.

The preferred security engine 110 combines the security posture 101, project model 108, and the, or each, implementation instructions 106 and, using the implementation engine 112, produces application specific software implementation(s) 115 of the relevant security protection(s) 104. The, or each, software implementation 115 may take any convenient form, for example the form of source code modules, source code portions, or other computer software component(s), that can be added into the software application source code, or provided as specific software libraries, or in any other manner that allows it to be incorporated into the target software application to implement the security protection 104.

In the present example the implementation engine 112 determines from the project model 108 that a credit card number is to be output to a particular web page in a selected colour. The implementation engine determines from the security posture 101 that the colour is brown. The implementation engine 112 may then use the relevant implementation instructions 106, which in this case may comprise the code template "<div style="color[colour_variable]">". The implementation engine 112 applies the 'brown' colour from the security posture 101 to the implementation instructions 106 to produce an output software implementation 115 of "<div style="color: #F4A460">".

The preferred security engine 110 combines the security posture 101, project model 108, and the or each assurance instructions 107 and, using the assurance engine 113, produces one or more project assurance 116 capabilities. Each project assurance 116 capability may take the form of computer program code, or other computer-usable or computer-executable instructions, that, when executed, test the interfaces and data handling capabilities, and/or any other relevant aspect of, of an instantiation of the target software application. The project assurance 116 capabilities could also take other forms, for example comprising text or diagrams describing how the security protection 104 can be manually verified.

In the present example the assurance engine 113 may generate a python module that accesses the web page from the a deployed version of the software application described by the project model 108, ensures the credit card is printed in the colour defined in the security posture 101, and preferably determines the risk associated with non-conformance to the security protection in relation to the project model.

Figure 4:
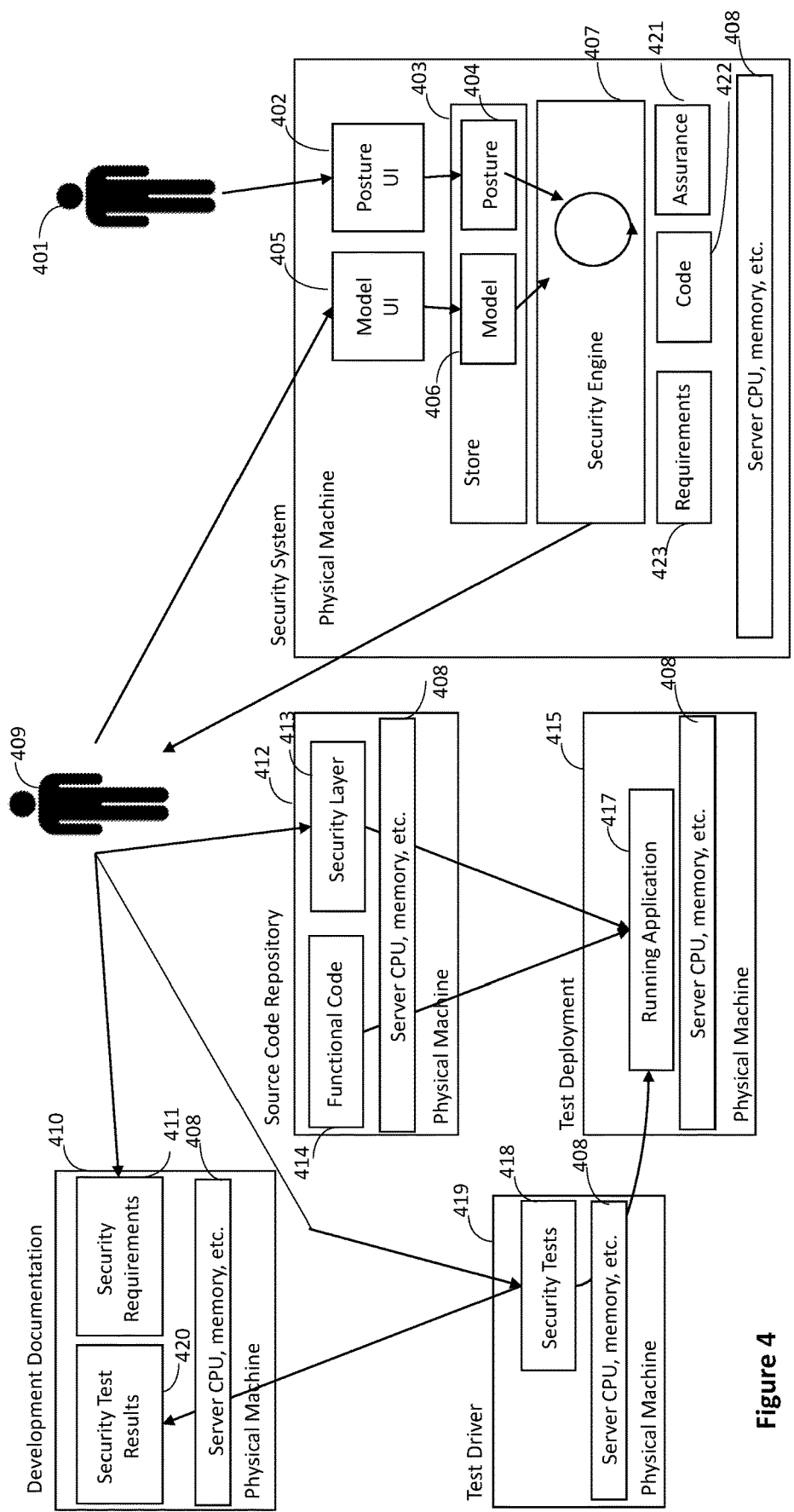
FIG. 4 is a schematic diagram of an exemplary computer system embodying the invention.

FIG. 4 is a schematic diagram of a computer system embodying one aspect of the invention and for implementing the method of applying security protections described with reference to FIGS. 1 to 3. It will be understood that the components of the computer system do not need to reside on the same hardware, or in the same software module, or otherwise at the same location, and that the illustrated example is only an exemplary embodiment. Also, as would be apparent to a skilled person, the computer software components of the system may share hardware components (e.g. CPUs, memories etc.) or may be provided with respective separate hardware as is convenient.

By way of example it is assumed that a first user 401, being a person responsible for defining the security posture, interacts with the security posture user interface 402 running as an executable program on a computer CPU 408 to define the technical security posture 101. The security posture 101 can be stored (404) in any conventional computer memory or store 403, for example provided on a computer file system or database running on the CPU 408. Optionally the posture user interface 402 and the stored security posture 404 could be supported by a computer (e.g. CPU 408) within an organization's own computer network, or by a computer accessible over the internet.

FIG. 4 further shows a second user 409, being a person with knowledge of the software project in respect of which the security protections are required, interacting with a project model user interface 405 running as an executable program on a computer CPU (which may or may not be the CPU 408 as is convenient) to define the project model 108. The project model 108 can be stored (406) in any conventional computer memory or store 403, for example provided on a computer file system or database running on the relevant CPU. The project model user interface 405 and the stored model 406 could be supported by a computer CPU within the organisation's computer network, or by a computer that is accessible over the internet.

Either user 401, 409 can send a signal to the security engine 407 to produce the outputs 114, 115, 116, the security engine 407 being a software instantiation, or other embodiment, of the security engine 110. The security engine 407 runs on the computer CPU 408 to combine the stored technical security posture 404 and the stored software project model 406 and produce the functionality and logic described above with reference to FIGS. 1 to 3. The security engine 407 conveniently comprises computer program code stored in any convenient computer memory for execution by a computer, which in this example is assumed to be the CPU 408.

The security engine 407 uses computer-usable representations of the requirement instructions 423 (which is an implementation of the requirement instructions 105), the code instructions 422 (which is an implementation of the implementation instructions 106) and the assurance instructions 421 (which is an implementation of the assurance instructions 107), as input. The instructions may comprise any convenient computer software component(s) stored in any convenient computer memory for use by a computer, which in this example is assumed to be the CPU 408, in particular when instantiating the security engine 407. In use, the instructions may be populated and/or selected, as required, depending on the contents of the security posture 101.

The outputs 114, 115, 116 produced by the security engine 407 may be provided to the user 409 (by way of example) who can use the outputs to apply the security protections 104 specified in the security posture 402 to secure the software project. The illustrated provision of this output to the user 409 is only exemplary, and the output could be handled in other ways (e.g. not necessarily being provided to the user), such as being passed to another software program whereby one or more aspects of the output are applied directly to any target source code. The outputs 114, 115, 116 may take any suitable computer usable form, for example as described above with reference to FIG. 1, and may be stored in any convenient computer memory.

In the system of FIG. 4, the user 409 may provide the functional requirements (114 in FIG. 1) textual security requirements 411 to a software document repository 410. The software implementation (115 in FIG. 1) may be provided to a project source code repository 412 as a security layer 413. Optionally, the security layer 413 may be combined with existing software project source code 414 and compiled into a running application 417. This compilation of the security layer 413 and project source code 414 could occur on any computer, which in this example may be the CPU 408. It will be understood that this is only one example of how to apply the software implementation 115 to an existing software project source code base, as other options exist to combine these elements.

The project assurance output (116 from FIG. 1) is provided to a computer running over a CPU 408 whereby executable programs can run as security tests 418. These security tests 418 can access the running application 417 (which combines the functional code 414 and security layer 413) to provide assurance the requested security posture 404 (101 in FIG. 1) exists. The security tests 418 determine the risk associated with any failed tests, and adds this information to the test results 420. In this example the tests provide results 420 to allow tracking, assurance and preferably also risk metrics.

There are many software security vulnerabilities that may each require a security protection 104. Also various organizations may wish to protect their software applications with some security protections 104 and not others. Preferred embodiments of the invention allow the security protections 104 to be flexible and extensible, allowing organizations to only apply the security protections 104 that they desire.

There may also be cases whereby a commercial product, being an embodiment of the invention, defines security protections 104 which do not match with the specific needs of a particular organization. One example of this is where an organization wishes to have all credit card numbers displayed to the end user in a particular colour on the application web pages (as per the example used before). While the commercial product may not contain such a security protection 104, the organization producing many software applications with this security requirement may wish for that requirement to be applied as consistently as other security protections 104. This may be facilitated by providing the security protection 104 as a plug-in software component.

Figure 5:
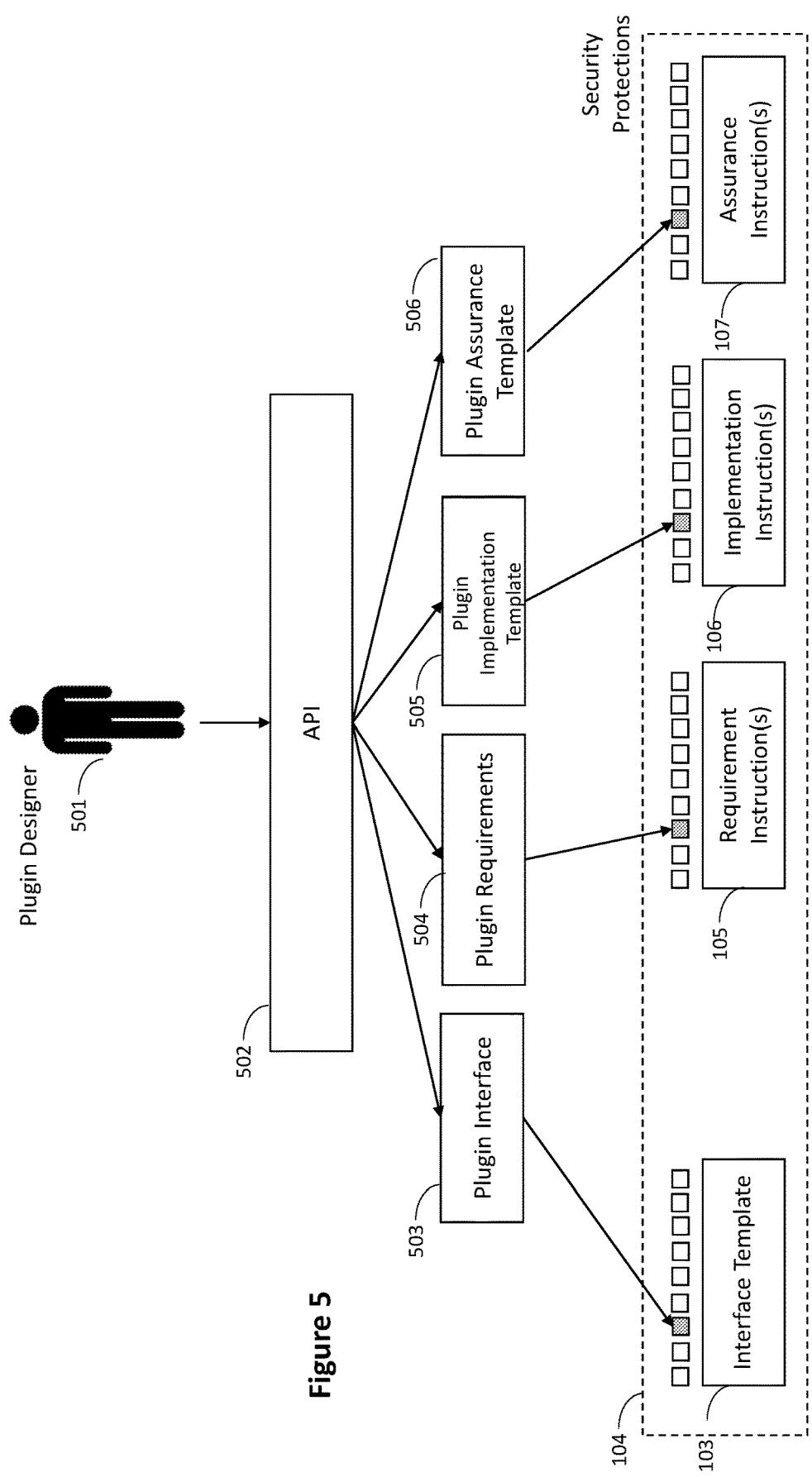
FIG. 5 is a schematic diagram illustrating conceptually a method and system for creating security protections.

Accordingly, in some embodiments one or more of the security protections 104 are customizable, or may be created by the organization itself, or by a third party. This is illustrated in FIG. 5. A person or contractor for the organization, shown as a plugin designer 501, may use a documented procedure, or software wizard, to create an instance of a security protection 104 specific to their need. Such an instance would may be implemented as a plug-in software component.

In such embodiments, the system may expose an application programming interface, shown as API 502, whereby the plugin designer 501 can implement the any security protection 104 they wish to have consistently applied to the organization's software applications. Through the API 502 the plugin designer 501 may create an instance of a plugin interface 503 description, a plugin requirements 504 module, a plugin code instructions module 505, and a plugin assurance instructions module 506.

The plugin interface 503 description allows a product embodying the invention to supply user interface input requirements, e.g. questions/items, to the security posture input 102. An example of this is the requirement to select the colour in which to present the credit card numbers on a web page. The plugin requirements 504 module may contain text, or other information, specifying (for the benefit of the relevant users) that the credit card numbers displayed on any web page should be in the specified colour. This requirement could be printed out as a PDF or other formatted document, allowing the software development team, along with any other interested teams, to understand the nature of the requirement to satisfy the desired security protection 104 within the security posture 101.

The plugin implementation (or code) instructions 505 may comprise computer program code, or other computer-usable or computer-executable instructions to implement the requirement. In the present example this contains HTML source code that modified the text colour of a credit card number to be displayed on a web page. The plugin assurance instructions 406 in the present example may comprise a software binary that makes a request to the relevant web pages, captures the responses and ensures the colour of all credit card numbers were of the specified colour.

In cases where a security protection 104 is created as a plugin, and incorporated into a system embodying the invention, the plugin interface 503 may be added to the interface template 103. The plugin interface 503 may be any one of a number of plugins hosted in the interface template 103, as illustrated in FIG. 5 by the boxes above the interface template 103.

Similarly the plugin requirements 504 may be incorporated into the requirement instructions 105, the plugin implementation instructions 505 may be incorporated into the instantiations implementation instructions 106, and the plugin assurance instructions 506 may be incorporated into the instantiations assurance instructions 107.

It will be understood that methods described herein or methods otherwise embodying the invention may be implemented in software, firmware, hardware, or a combination thereof as is convenient. In one mode, the methods are implemented in software, as one or more executable program, and executed by one or more special or general purpose digital computer(s), such as a personal computer (PC; IBM-compatible, Apple-compatible, or otherwise), personal digital assistant, workstation, minicomputer, or mainframe computer. The steps of the methods may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the method as described above. The processor(s) is a hardware device for executing software, particularly software stored in memory. Processor(s) can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s). The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present teaching may include components provided as a source program, executable program (object code), script, or any other entity comprising a set of instructions to be performed by a computer. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method. Such an arrangement can be embodied in any computer readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. Any process descriptions or blocks in the Figures, should be understood as representing modules, segments, or portions of code which include one or more executable instructions for implementing specific logical functions or steps in the process, as would be understood by those having ordinary skill in the art.

As used herein, the terms "computer-usable" and "computer-executable" as applied to for example instructions, files, modules, templates or any other component of the system, are intended to mean that the relevant component comprises one or more instructions that may be performed by a computer to implement the relevant function(s). The instructions may be suitable for direct use by a computer (e.g. machine code) or suitable for use by the computer after being compiled (e.g. source code). The invention is not limited to the embodiment(s) described herein but can be amended or modified without departing from the scope of the present invention.

The invention claimed is:

1. A method of implementing a security posture in a computer software application, the security posture comprising a plurality of security requirements for a computer software application, the method comprising:
   providing, on a computer system, a configurable security protection component comprising at least one set of at least one computer-usable instruction, wherein said at least one set of at least one computer-usable instruction comprises:
      a configurable code instruction set comprising at least one computer-usable instruction for implementing at least one of said security requirements, and
      a configurable assurance instruction set comprising at least one computer-usable instruction for testing said at least one of said security requirements;
   providing, on said computer system, a computer-usable representation of said security posture;
   providing, on said computer system, a computer-usable model of said computer software application;
   causing said computer system to configure said code instruction set using said computer-usable representation of said security posture, and to use the configured code instruction set and said computer-usable model of said computer software application to generate at least one computer usable output comprising at least one computer usable instruction for implementing said at least one of said security requirements; and
   causing said computer system to configure said assurance instruction set using said computer-usable representation of said security posture, and to use the configured assurance instruction set and said computer-usable model of said computer software application to generate at least one computer-usable output for testing said at least one of said security requirements.

2. The method of claim 1, including causing said computer system to provide a user interface, said user interface being defined by at least one of said at least one set of at least one computer-usable instruction of said security protection component; and creating, in response to user input received by said user interface, said computer-usable representation of said security posture, wherein said at least one of said at least one set of at least one computer-usable instruction of said security protection component comprises a respective interface template for each of said security requirements, wherein each interface template is configured to provide said user interface with at least one user input element for at least one of said security requirements.

3. The method of claim 1, wherein said at least one set of at least one computer-usable instruction of said security protection component comprises a requirement instruction set comprising at least computer-renderable instruction for implementing at least one of said security requirements, wherein the method further includes causing said computer system to configure said requirement instruction set using said computer-usable representation of said security posture, and to use the configured requirement instruction set and said computer-usable model of said computer software application to generate at least one computer usable output for rendering instructions for said at least one of said security requirements.

4. The method of claim 1, wherein causing said computer system to configure said code instruction set comprises at least one of:
   populating, or otherwise configuring, at least one of said at least one computer-usable instruction of said code instruction set using data from said computer-usable representation of said security posture, and
   selecting at least one of said at least one computer-usable instruction of said code instruction set depending on said security posture.

5. The method of claim 1, wherein causing said computer system to configure said assurance instruction set comprises at least one of:
   populating, or otherwise configuring, at least one of said at least one computer-usable instruction of said assurance instruction set using data from said computer-usable representation of said security posture, and
   selecting at least one of said at least one computer-usable instruction of said assurance instruction set depending on said security posture.

6. The method of claim 1, wherein said computer-usable model of said software application comprises data defining at least one interface supported by said software application.

7. The method of claim 3, wherein causing said computer system to configure said requirement instruction set comprises at least one of:
   populating, or otherwise configuring, at least one of said at least one computer-renderable instruction of said requirement instruction set using data from said security posture; and
   selecting at least one of said at least one computer-renderable instruction of said requirement instruction set depending on said security posture.

8. The method of claim 3, wherein the method further involves identifying from said computer-usable model at least one feature of said software application relating to at least one of said at least one security requirements, and wherein causing said computer system to configure said requirement instruction set comprises at least one of:
   populating, or otherwise configuring, at least one of said at least one computer-renderable instruction of said requirement instruction set depending on said at least one identified feature of said software application; and
   selecting at least one of said at least one computer-renderable instruction of said requirement instruction set depending on said at least one identified feature of said software application.

9. The method of claim 1, further including identifying from said computer-usable model at least one feature of said software application relating to at least one of said at least one security requirements, and wherein causing said computer system to configure said code instruction set comprises at least one of:

populating, or otherwise configuring, at least one of said at least one computer-usable instruction of said code instruction set depending on said at least one identified feature of said software application; and selecting at least one of said at least one computer-usable instruction of said code instruction set depending on said at least one identified feature of said software application.

10. The method of claim 5, including identifying from said computer-usable model at least one feature of said software application relating to at least one of said at least one security requirements, and wherein causing said computer system to configure said assurance instruction set comprises at least one of:

populating, or otherwise configuring, at least one of said at least one computer-usable instruction of said assurance instruction set depending on said at least one identified feature of said software application; and selecting at least one of said at least one computer-usable instruction of said assurance instruction set depending on said at least one identified feature of said software application.

11. The method of claim 1, further including causing said computer system to determine a risk associated with at least one of said security requirements, and to generate at least one computer-renderable output for rendering information identifying said risk.

* * * * *